(12) United States Patent
Choi et al.

(10) Patent No.: US 10,389,219 B2
(45) Date of Patent: Aug. 20, 2019

(54) VIBRATION ACTUATOR

(71) Applicant: JAHWA electronics Co., Ltd., Chungcheongbuk-do (KR)

(72) Inventors: Nam Jin Choi, Chungcheongbuk-do (KR); Kyung Hoon Jo, Chungcheongbuk-do (KR); Soon Koo Shim, Chungcheongbuk-do (KR); Young Bin Chong, Chungcheongbuk-do (KR); Won Gook Lee, Chungcheongbuk-do (KR); Min Goo Lee, Chungcheongbuk-do (KR)

(73) Assignee: JAHWA ELECTRONICS CO., LTD., Chungcheongbuk-Do (KR)

( * ) Notice: Subject to any disclaimer, the term of this patent is extended or adjusted under 35 U.S.C. 154(b) by 397 days.

(21) Appl. No.: 15/334,691

(22) Filed: Oct. 26, 2016

(65) Prior Publication Data

US 2018/0006542 A1 Jan. 4, 2018

(30) Foreign Application Priority Data

Jul. 1, 2016 (KR) .................. 10-2016-0083740
Aug. 16, 2016 (KR) .................. 10-2016-0103746

(51) Int. Cl.
 *H02K 33/02* (2006.01)
 *H02K 1/02* (2006.01)
 *H02K 1/12* (2006.01)
 *H02K 1/34* (2006.01)

(52) U.S. Cl.
CPC .............. *H02K 33/02* (2013.01); *H02K 1/02* (2013.01); *H02K 1/12* (2013.01); *H02K 1/34* (2013.01)

(58) Field of Classification Search
CPC ............ H02K 33/02; H02K 1/02; H02K 1/12; H02K 1/34
USPC ........................................................ 310/15
See application file for complete search history.

(56) References Cited

U.S. PATENT DOCUMENTS

| 8,247,944 | B2 * | 8/2012 | Gebregergis | ........... H01R 39/40 |
| | | | | 310/242 |
| 8,253,299 | B1 * | 8/2012 | Rittenhouse | ............. B62M 6/90 |
| | | | | 310/257 |
| 9,742,254 | B1 * | 8/2017 | Choi | ....................... H02K 33/00 |
| 2007/0182257 | A1 * | 8/2007 | Miura | ..................... B06B 1/045 |
| | | | | 310/15 |
| 2012/0319506 | A1 * | 12/2012 | Shim | ....................... B06B 1/045 |
| | | | | 310/25 |

(Continued)

FOREIGN PATENT DOCUMENTS

| JP | 2006-007161 A | 1/2006 |
| KR | 10-1046044 B1 | 7/2011 |

(Continued)

*Primary Examiner* — Forrest M Phillips
(74) *Attorney, Agent, or Firm* — The PL Law Group, PLLC

(57) ABSTRACT

A vibration actuator includes a bracket coupled to a case to form an inner space; a stator having a circuit board coupled to an upper surface of the bracket, a coil connected to the circuit board, and a yoke provided in the coil; a vibrator having a permanent magnet disposed at an outer side of the coil and a weight coupled to an outer circumference of the permanent magnet; an elastic member configured to connect the stator and the vibrator and elastically support the vibrator; and a non-magnetic damper provided between the weight and the elastic member.

13 Claims, 16 Drawing Sheets

(56) References Cited

U.S. PATENT DOCUMENTS

| | | | | |
|---|---|---|---|---|
| 2013/0043741 A1* | 2/2013 | Jun | ......................... | H02K 33/16 |
| | | | | 310/15 |
| 2013/0093266 A1* | 4/2013 | Hong | ..................... | H02K 33/18 |
| | | | | 310/15 |
| 2013/0113305 A1* | 5/2013 | Choi | ...................... | H02K 33/18 |
| | | | | 310/15 |
| 2013/0241321 A1* | 9/2013 | Akanuma | ................ | H02K 5/24 |
| | | | | 310/25 |

FOREIGN PATENT DOCUMENTS

| | | |
|---|---|---|
| KR | 10-1101330 B1 | 12/2011 |
| KR | 10-2012-0054685 A | 5/2012 |
| KR | 10-1180486 B1 | 9/2012 |
| KR | 10-1354867 B1 | 1/2014 |
| KR | 10-2015-0053105 A | 5/2015 |

\* cited by examiner

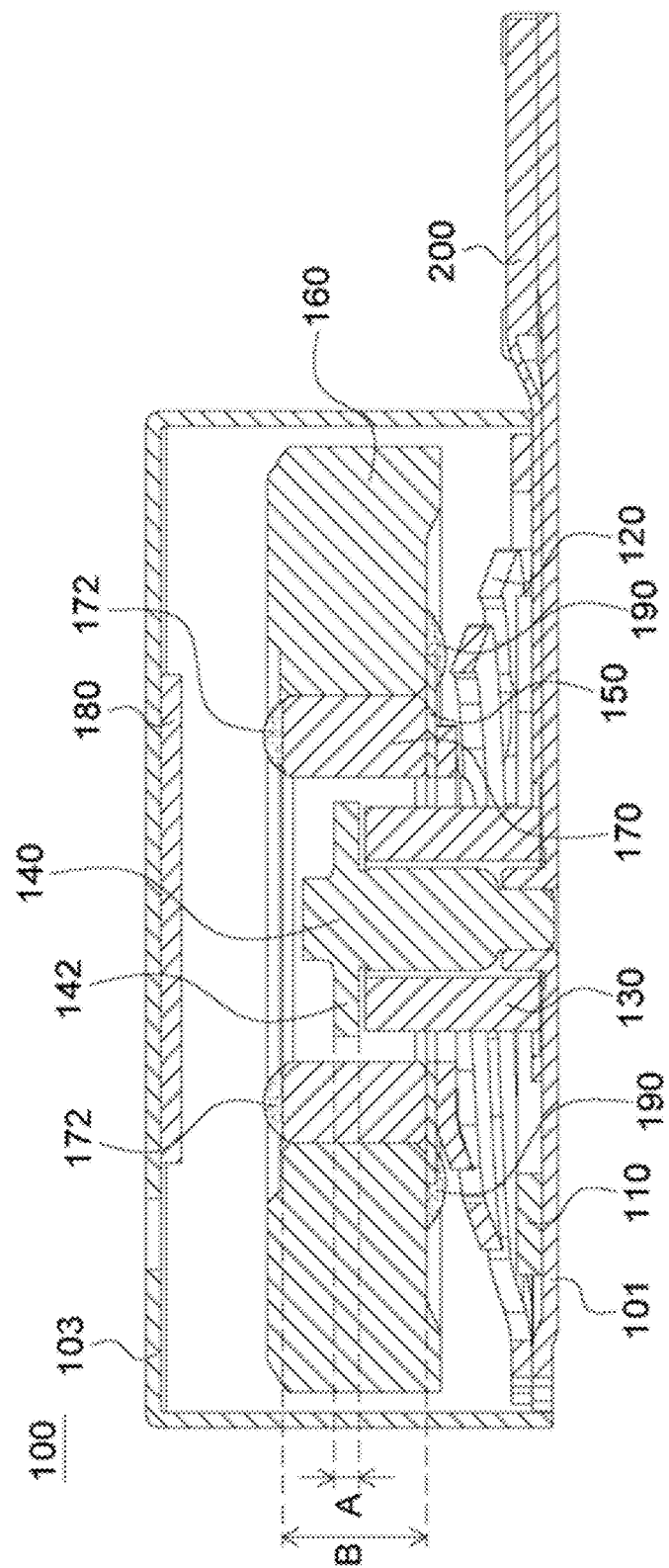

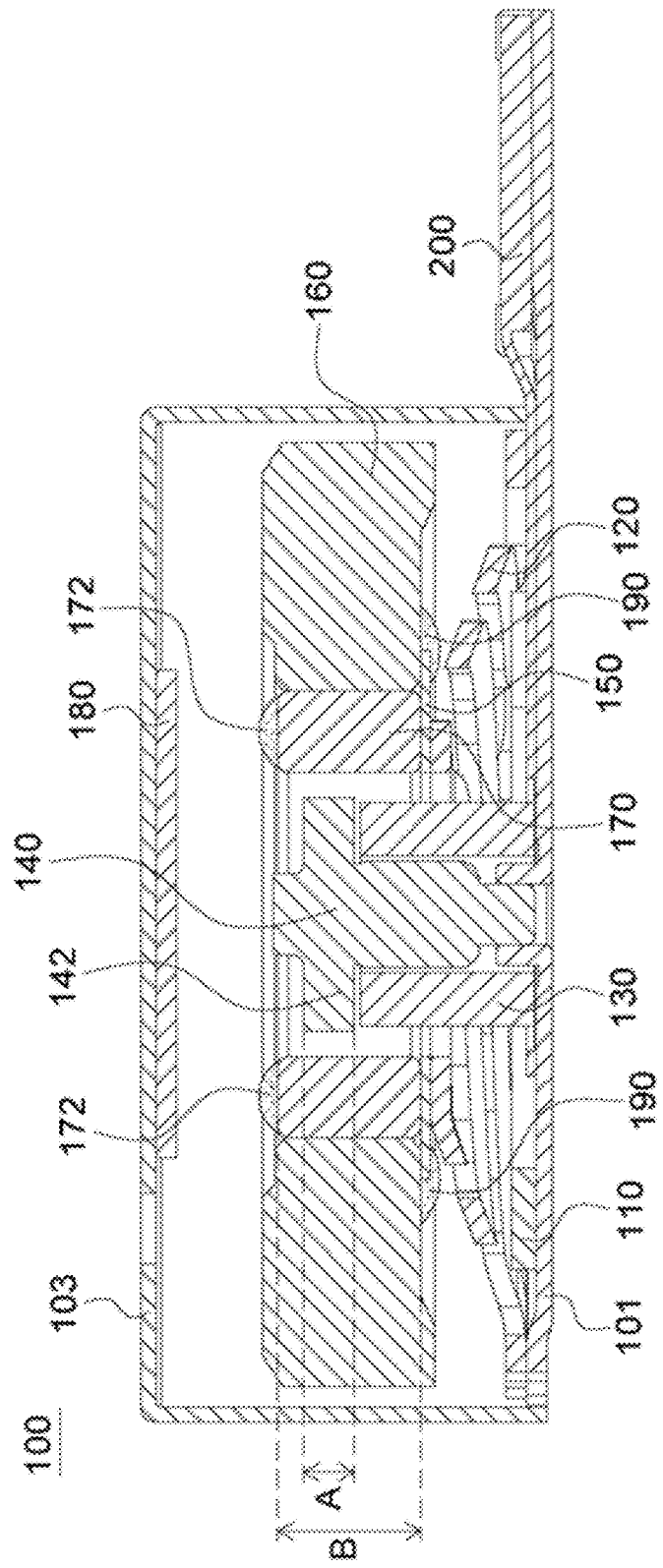

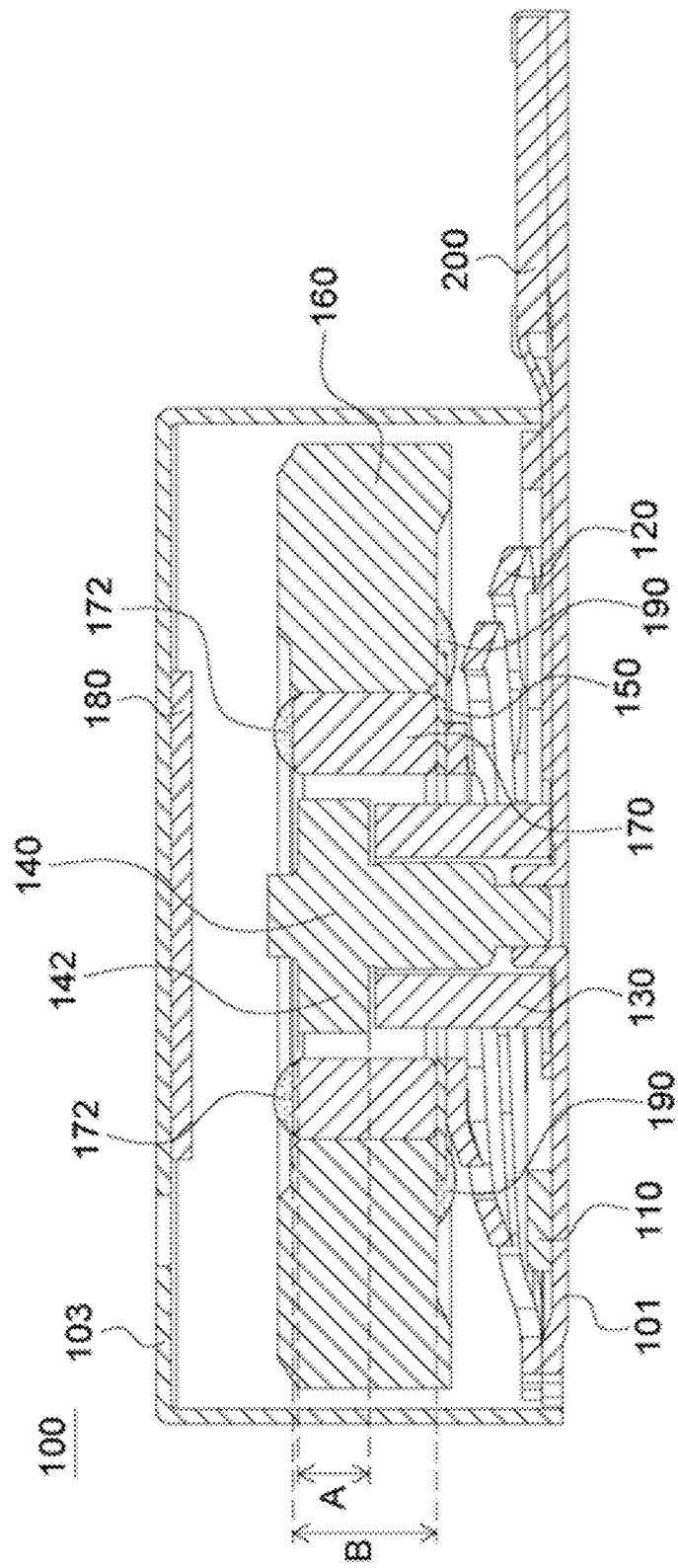

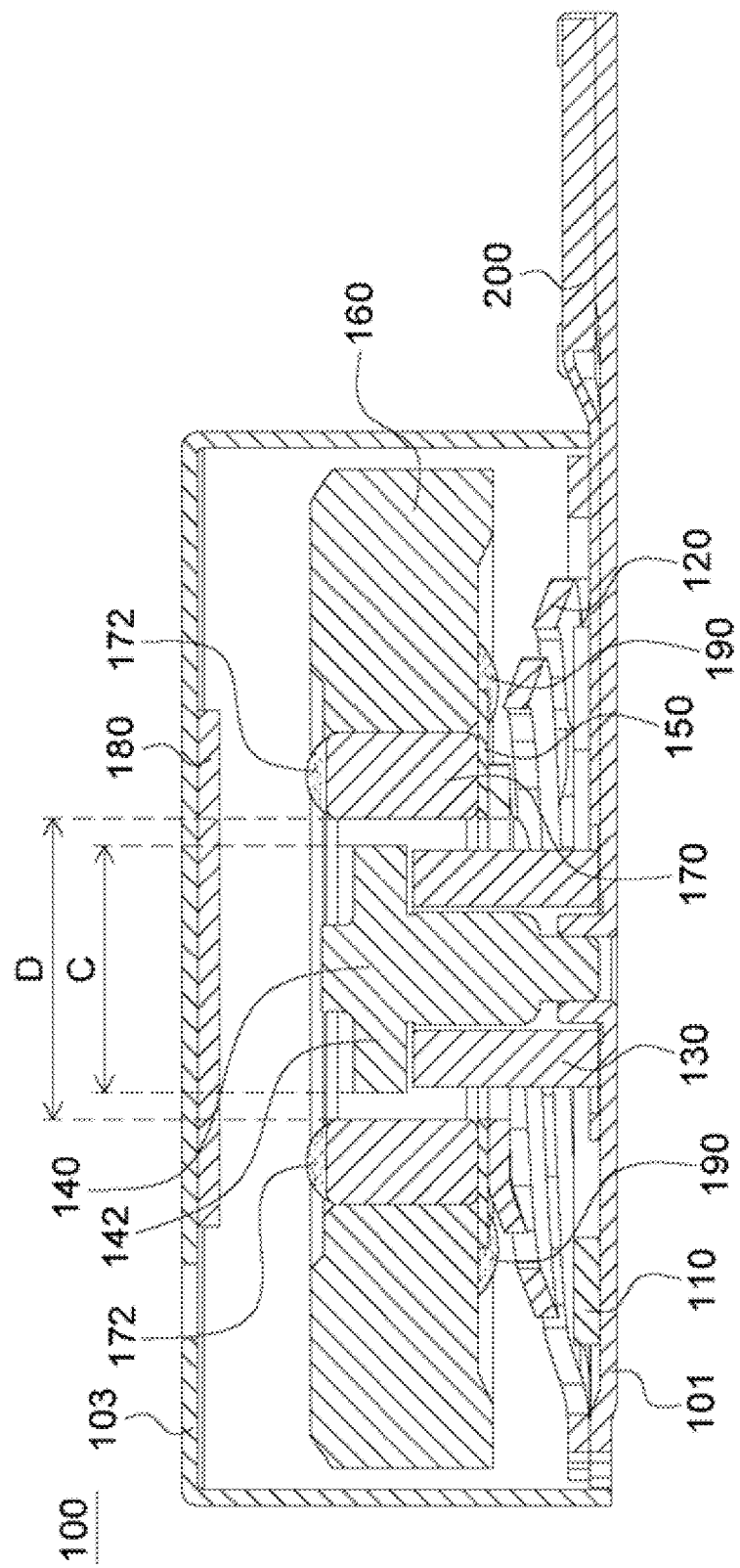

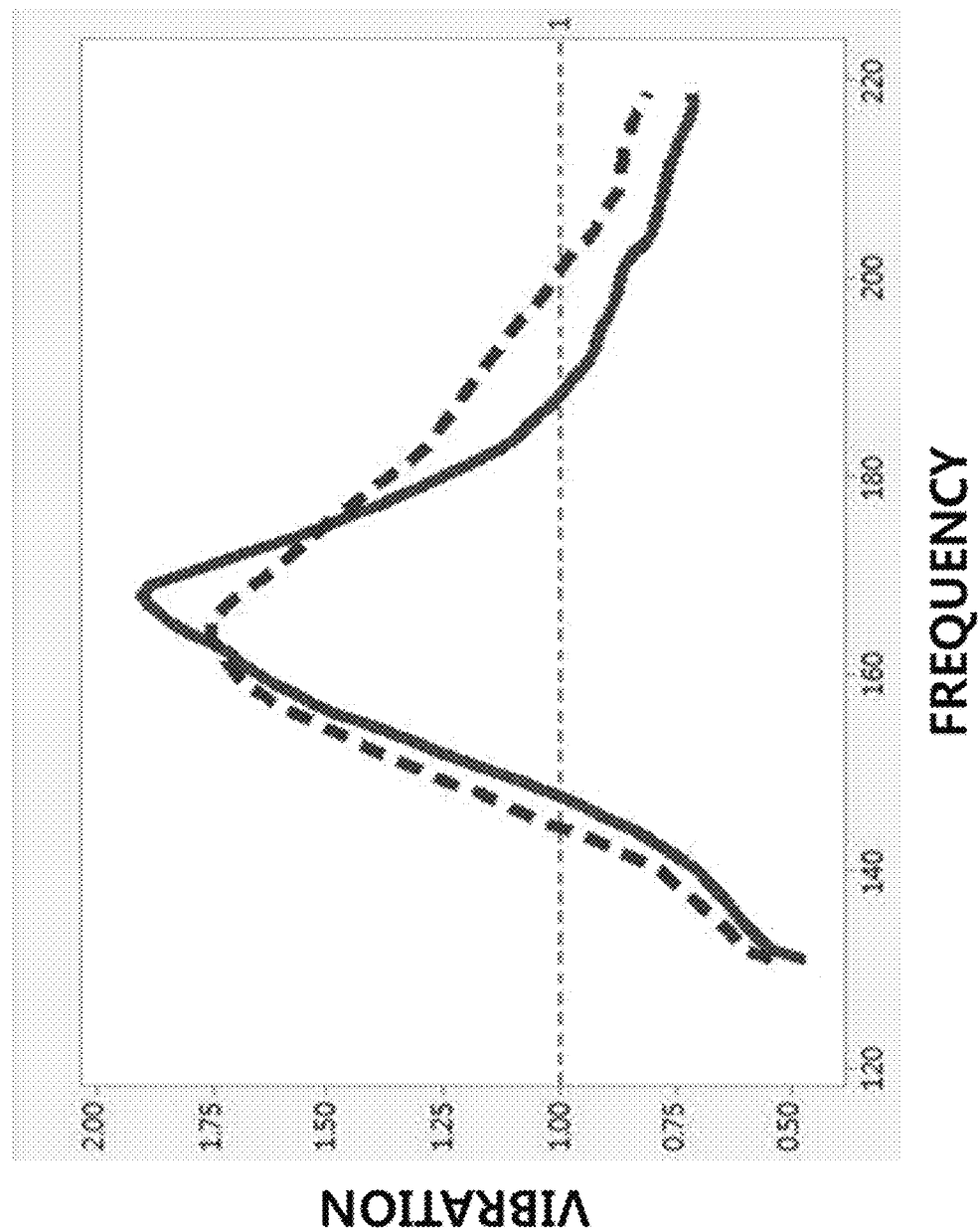

VIBRATION ACTUATOR

CROSS-REFERENCE TO RELATED APPLICATION AND CLAIM OF PRIORITY

The present application claims priority to Korean Patent Application No. 10-2016-0103746 filed on Aug. 16, 2016 and No. 10-2016-0083740 filed on Jul. 1, 2016 in the Korea Intellectual Property Office, the disclosures of which are incorporated herein by reference.

BACKGROUND

1. Technical Field

The present disclosure relates to a vibration actuator, and more particularly, to a vibration actuator capable of adjusting a resonance frequency band as desired by a user, improving vibration power and response speed, and suppressing vibration and noise caused by collision of internal components by means of an adjusted shape of a wing portion of a yoke.

2. Background Art

Recently, a linear vibration actuator used as a silent receiver of a portable terminal copes with a slim design of the portable terminal since it has a short stroke distance (up and down movement rather than rotation) and ensures rapid vibration at a starting or stopping moment due to elasticity of an elastic member in comparison to an existing eccentric rotating vibration actuator.

The linear vibration actuator is generally composed of a vibrator having a permanent magnet and a stator supporting the vibrator, and the permanent magnet moves up and down by means of an interaction between an electromagnetic force generated by applying a current to a coil disposed at the stator and a magnetic force generated from the permanent magnet to generate vibrations.

In detail, in an existing linear vibration actuator, a stator having a coil and a vibrator having a permanent magnet are disposed in a case, and an elastic member is provided to elastically support the permanent magnet to generate vibrations.

In addition to the above structure, a vibration actuator may also be configured so that a permanent magnet is provided at a stator, and a coil is coupled to a weight and provided at a vibrator. This vibration actuator is disclosed in Korean Patent Registration No. 10-1354867 and Korean Patent Registration No. 10-1046044.

Meanwhile, in these days, as the vibration actuator is applied to more diverse devices, diverse vibration characteristics are demanded, and an effective frequency range applied thereto is increased. Thus, there is an increased need to cover a broad effective frequency range to cope with the current trend and also adjust design variables between a yoke and a permanent magnet in order to give optimal response performance by increasing a response speed.

In addition, even though the vibration actuator has an advantage in that a stroke distance of a vibrator is short to ensure a fast response, but in order to generate vibrations recognizable by a human, the vibrator should reciprocate fast as much as the short stroke distance. In other words, the vibrator should have sufficient acceleration, and if an amount of current supplied to the coil is increased in order to make a strong magnetic force, the portable terminal consumes the battery rapidly, and thus the permanent magnet should be designed to have a great magnetic flux. For this reason, most linear vibration actuators use a so-called neodymium magnet having neodymium, which is a rear-earth metal with a strong magnetic flux.

However, since the rear-earth metal is rapidly oxidized and corroded in the art, the surface of the neodymium magnet is coated. At the present, most linear vibration actuators employ a neodymium magnet whose surface is plated with nickel.

Nickel plating has an advantage in an excellent mechanical strength of the plating film, but since it is a ferromagnetic substance, an eddy phenomenon occurs, which causes a damage to the magnetic flux. Also, the loss of magnetic flux gives an influence on the magnetic force of the neodymium magnet and also gives a restrictive problem in providing a vibration characteristic in a low-frequency band which is demanded in realizing haptic vibrations.

SUMMARY

Embodiments of the present disclosure are directed to coping with various vibration characteristics demanded in the art and enlarging an effective frequency range applied in the art.

In addition, the present disclosure is directed to increasing a response speed of a vibration actuator by adjusting design variables in relation to electromagnetic characteristics, rather than a mechanical restoring force.

Further, the present disclosure is directed to providing a method for improving vibration characteristics of a vibration actuator without using a heavy metal such as nickel on the surface of a neodymium magnet applied to a linear vibration actuator.

In one aspect of the present disclosure, there is provided a vibration actuator, comprising: a bracket coupled to a case to form an inner space; a stator having a circuit board coupled to an upper surface of the bracket, a coil connected to the circuit board, and a yoke provided in the coil; a vibrator having a permanent magnet disposed at an outer side of the coil and a weight coupled to an outer circumference of the permanent magnet; an elastic member configured to connect the stator and the vibrator and elastically support the vibrator; and a non-magnetic damper provided between the weight and the elastic member.

The vibration actuator according to the present disclosure may further comprise a plate interposed between the vibrator and the elastic member, and the non-magnetic damper may be applied to cover at least a part of the plate and the weight.

The non-magnetic damper may be made of liquid grease.

The vibration actuator according to the present disclosure may further comprise a magnetic fluid applied on an upper surface of the permanent magnet.

The vibration actuator according to the present disclosure may further comprise a first damper provided at the upper surface of the bracket and a second damper provided at a lower surface of an upper portion of the case.

The yoke may include a wing portion extending from a center thereof toward an outer circumference thereof.

A ratio of a thickness of the wing portion to a thickness of the permanent magnet may be 0.05 to 0.7.

A ratio of a diameter of the wing portion to an inner diameter of the permanent magnet may be 0.4 to 0.99.

The permanent magnet of the present disclosure may be a neodymium magnet plated with a non-magnetic metal, and the non-magnetic metal may be zinc.

In addition, the neodymium magnet plated with zinc according to the present disclosure may expand an effective vibration frequency bandwidth by at least 30% on the basis of 1 G of the vibration actuator in comparison to a nickel-plated neodymium magnet.

Further, the vibration actuator including the zinc-plated neodymium magnet according to the present disclosure may have an effective vibration frequency bandwidth of 52 to 56 Hz.

In another aspect of the present disclosure, there is also provided a vibration actuator, comprising: a bracket coupled to a case to form an inner space; a stator having a circuit board coupled to an upper surface of the bracket, a coil connected to the circuit board, and a yoke provided in the coil and including a wing portion extending from a center thereof toward an outer circumference thereof; a vibrator having a permanent magnet disposed at an outer side of the coil and a weight coupled to an outer circumference of the permanent magnet; and an elastic member configured to connect the stator and the vibrator and elastically support the vibrator, wherein a ratio of a thickness of the wing portion of the yoke to a thickness of the permanent magnet is 0.05 to 0.7, and wherein a ratio of a diameter of the wing portion of the yoke to an inner diameter of the permanent magnet is 0.4 to 0.99.

The vibration actuator according to the present disclosure may further comprise a non-magnetic damper provided between the weight and the elastic member.

Embodiments of the present disclosure may cope with various vibration characteristics demanded in the art and enlarge an effective frequency range applied in the art.

In addition, it is possible to increase a response speed of a vibration actuator by adjusting design variables in relation to electromagnetic characteristics, rather than a mechanical restoring force.

Further, according to an embodiment of the present disclosure, a neodymium magnet of the present disclosure is plated with a magnetic substance such as zinc and improves power consumption of the linear vibration actuator by reducing a loss of magnetic flux.

In addition, the zinc-plated neodymium magnet of the present disclosure may improve sensitivity quality for vibrations of a portable terminal by enlarging an effective frequency bandwidth of the linear vibration actuator.

Moreover, it is possible to solve a problem that a magnetic fluid deviates from its original position to move toward a permanent magnet and thus is not located at a position for performing its damping function.

Further, in the present disclosure, embodiments of the present disclosure may be applied in combination to provide a vibration actuator more suitable for various needs of users by optimally enlarging a frequency band and improving vibration characteristics, center frequency shifting, and a response speed, demanded for haptic operation.

BRIEF DESCRIPTION OF DRAWINGS

FIGS. 4(a), 4(b) and 4(c) are side-sectional views showing a vibration actuator according to an embodiment of the present disclosure, which is modified according to the change of thickness of a yoke wing portion.

FIGS. 6(a), 6(b) and 6(c) are side-sectional views showing a vibration actuator according to an embodiment of the present disclosure, which is modified according to the change of diameter of the yoke wing portion.

FIG. 12 is a graph comparatively showing frequency characteristics of a neodymium magnet plated with zinc according to the present disclosure and an existing neodymium magnet plated with nickel.

DETAILED DESCRIPTION

Figure 1:
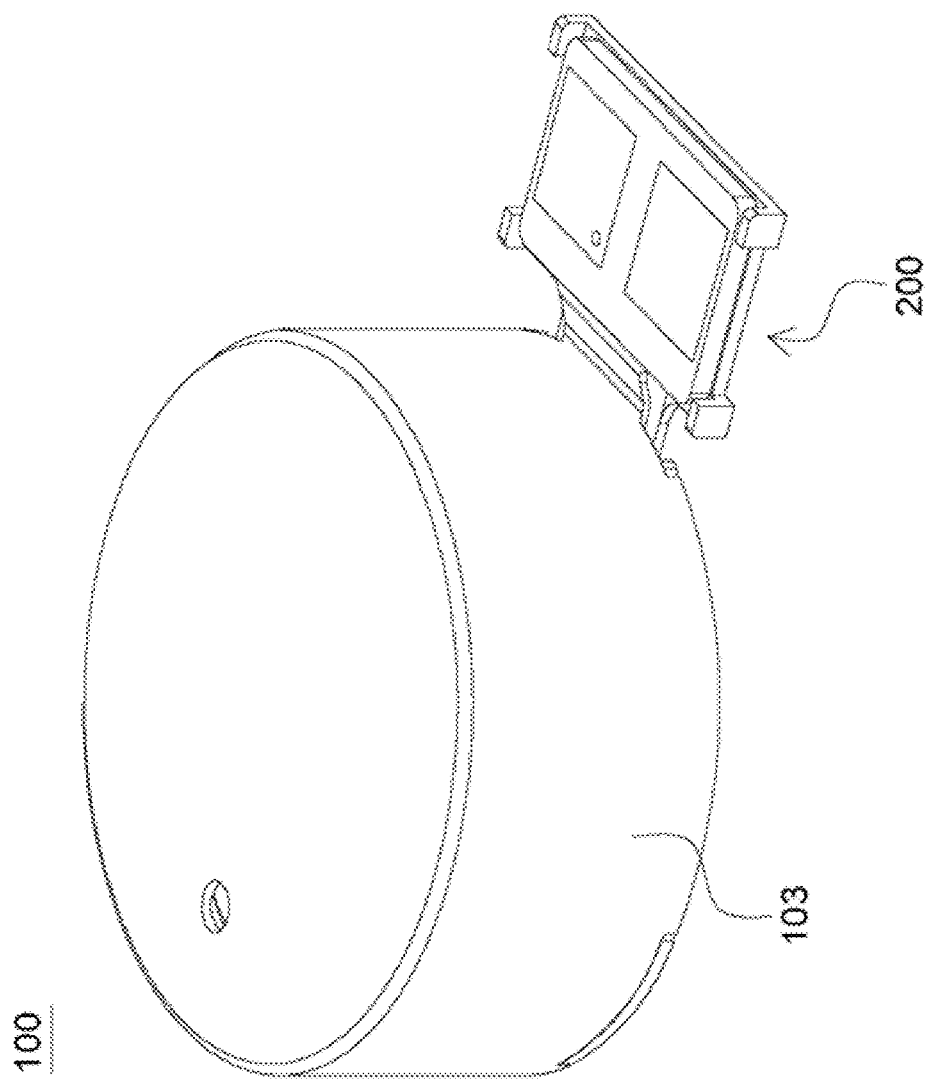
FIG. 1 is a perspective view showing a vibration actuator according to an embodiment of the present disclosure.
Figure 2:
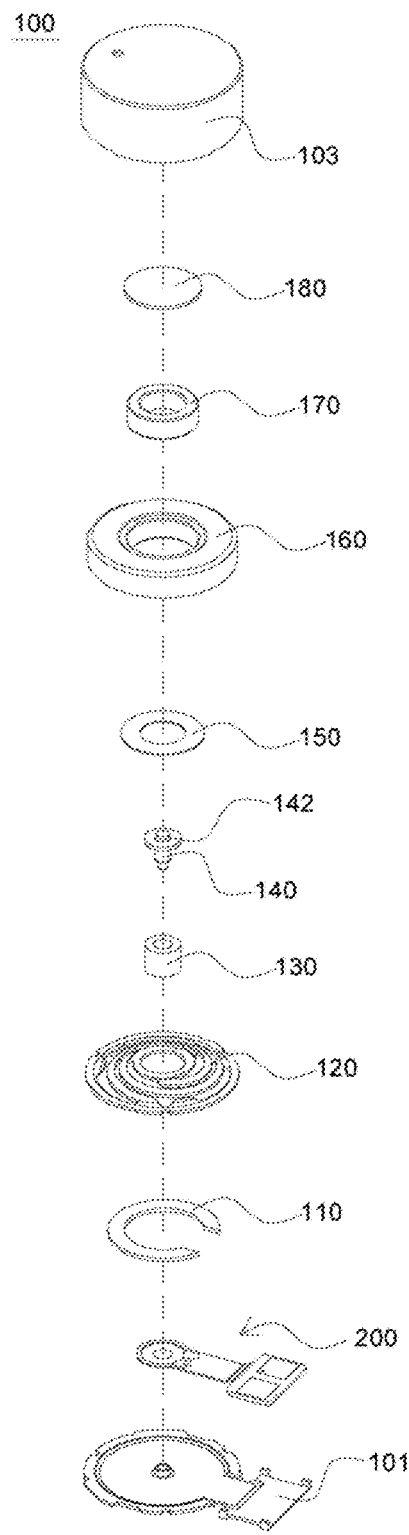
FIG. 2 is an exploded perspective view showing the vibration actuator according to an embodiment of the present disclosure.
Figure 3:
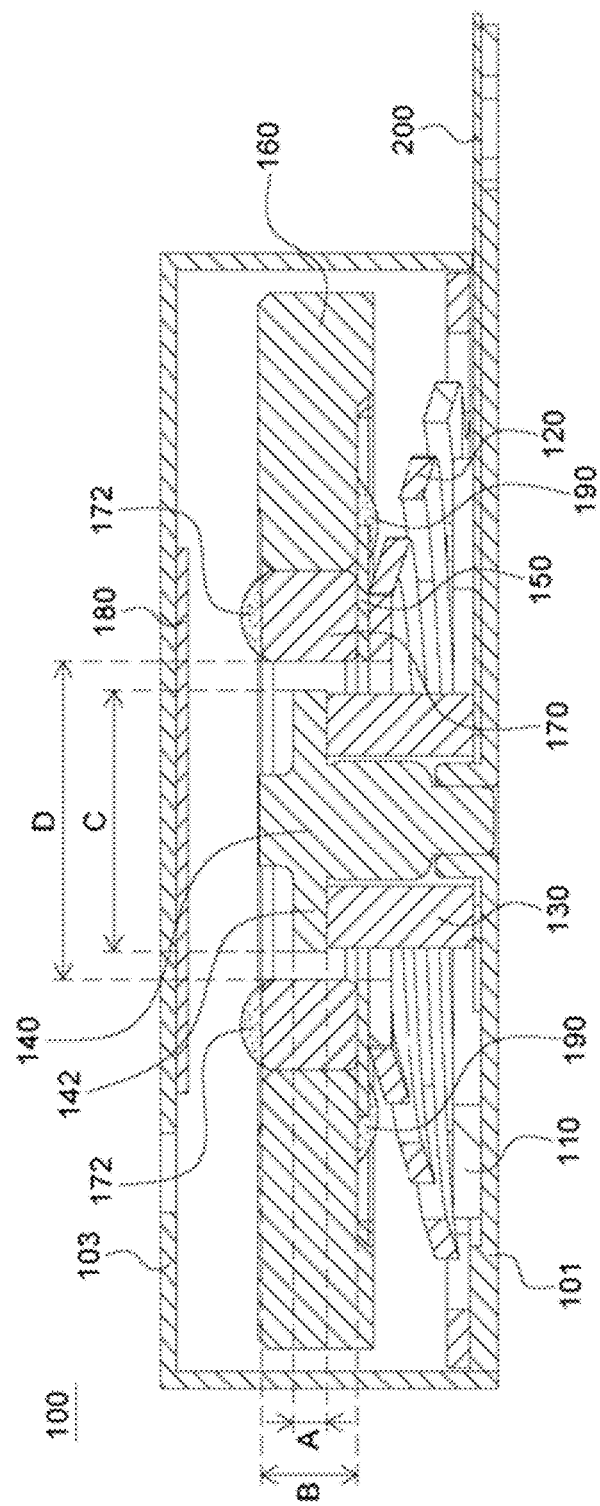
FIG. 3 is a side-sectional view showing the vibration actuator according to an embodiment of the present disclosure.

FIG. 1 is a perspective view showing a vibration actuator according to an embodiment of the present disclosure, FIG. 2 is an exploded perspective view showing the vibration actuator according to an embodiment of the present disclosure, and FIG. 3 is a side-sectional view showing the vibration actuator according to an embodiment of the present disclosure.

Referring to FIG. 1 to FIG. 3, a vibration actuator 100 according to an embodiment of the present disclosure may include a bracket 101 coupled to a case 103 to form an inner space; a stator having a circuit board 200 coupled to an upper surface of the bracket 101, a coil 130 connected to the circuit board 200, and a yoke 140 disposed in the coil 130; a vibrator having a permanent magnet 170 disposed at an outer side of the coil 130 and a weight 160 coupled to an outer circumference of the permanent magnet 170; and an elastic member 120 configured to connect the stator and the vibrator and elastically support the vibrator.

In detail, the case 103 and the bracket 101 are coupled to each other to form an accommodation space therein, the circuit board 200 is coupled to the upper surface of the bracket 101, and the yoke 140 is provided in the coil 130 attached to the circuit board 200. Here, the case 103, the bracket 101, the circuit board 200, the coil 130 and the yoke 140 configure a stator.

In addition, the permanent magnet 170 having a ring shape is disposed at an outer side of the coil 130, and the weight 160 is coupled to the outer circumference of the permanent magnet 170, thereby configuring a vibrator. A first damper 110 and a second damper 180 may be respectively provided at upper and lower portions of the case 103 to relieve an impact caused by vibrations.

The elastic member 120 is interposed between the stator and the vibrator to elastically support vertical movement of the vibrator. At this time, a plate 150 may be provided to connect the vibrator and the elastic member 120. In the vibration actuator 100 configured as above, when an AC power is applied through the circuit board 200, the vibrator vibrates vertically.

A magnetic fluid 172 serving as a damper is applied to an upper surface of the permanent magnet 170 in order to prevent damage, vibration and noise caused by impacts when the vibration actuator 100 generates vibrations.

Meanwhile, in an existing technique, a magnetic fluid is also applied to a region where the vibrator and the elastic member 120 are connected, namely a region near an installation portion of the plate 150. However, if the magnetic fluid is applied in this way, the magnetic fluid tends to consistently move toward the permanent magnet 170.

In this case, the magnetic fluid applied around the permanent magnet 170 deviates from its original position and moves toward the permanent magnet 170 and thus is not located at a position for performing its damping function, differently from a magnetic fluid applied directly to the permanent magnet 170.

In order to solve this problem, in an embodiment of the present disclosure, a non-magnetic damper 190 may be provided between the weight 160 and the elastic member 120. In detail, the non-magnetic damper 190 may be applied to cover at least a part of the plate 150 and the weight 160.

At this time, the non-magnetic damper 190 is made of liquid grease without a magnetic property and thus may give a damping function at an originally applied location without moving toward the permanent magnet 170.

Meanwhile, the vibration actuator 100 according to the present disclosure may be implemented to cover a broad effective frequency range and give optimal response performance by means of an increased response speed by adjusting design factors in relation to a shape of the yoke 140. Hereinafter, the design factors of the yoke 140 will be described.

Figure 5:
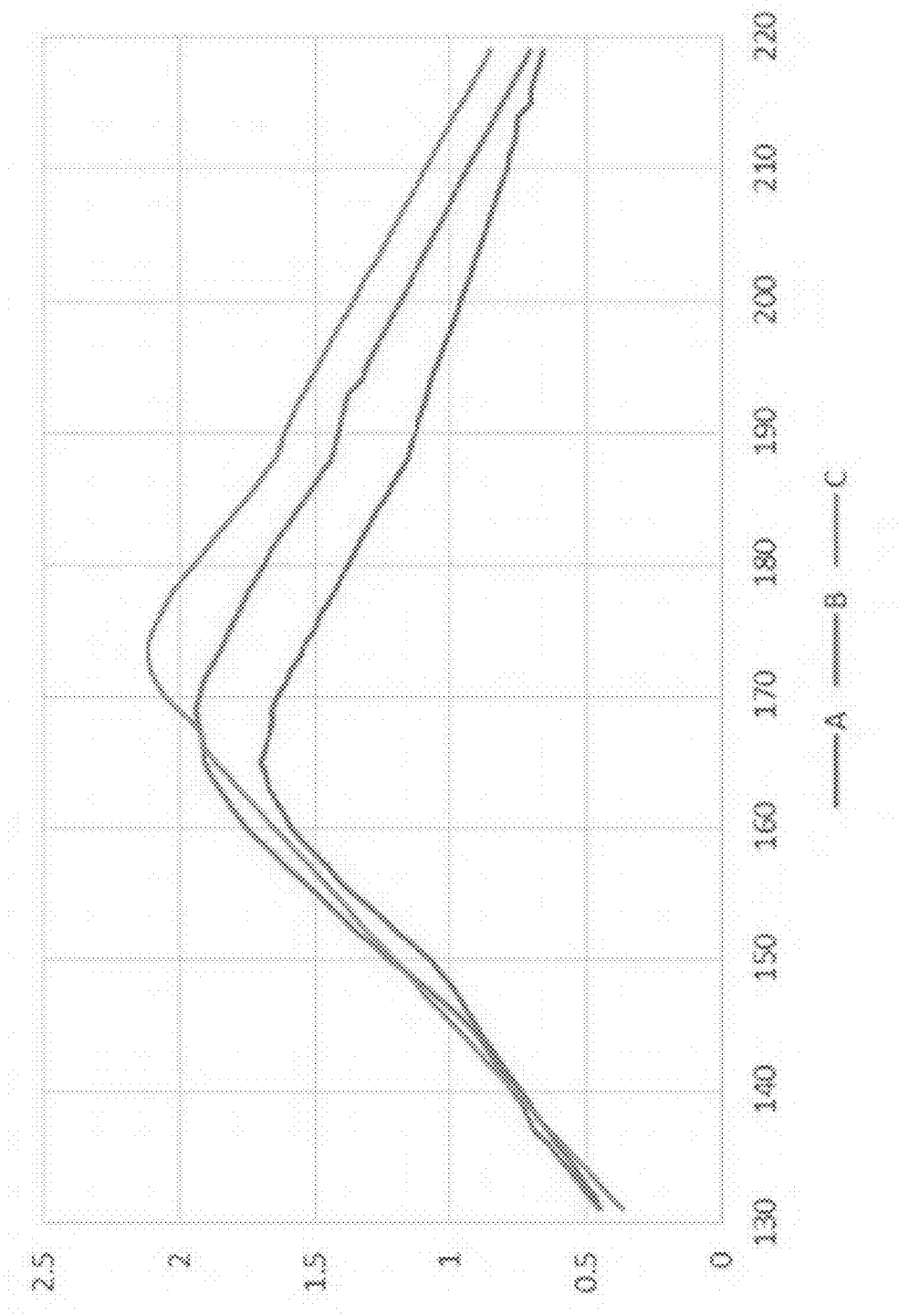
FIG. 5 is a graph showing a resonance frequency band according to the change of thickness of the yoke wing portion, depicted in FIGS. 4(a), 4(b) and 4(c).
Figure 6A:
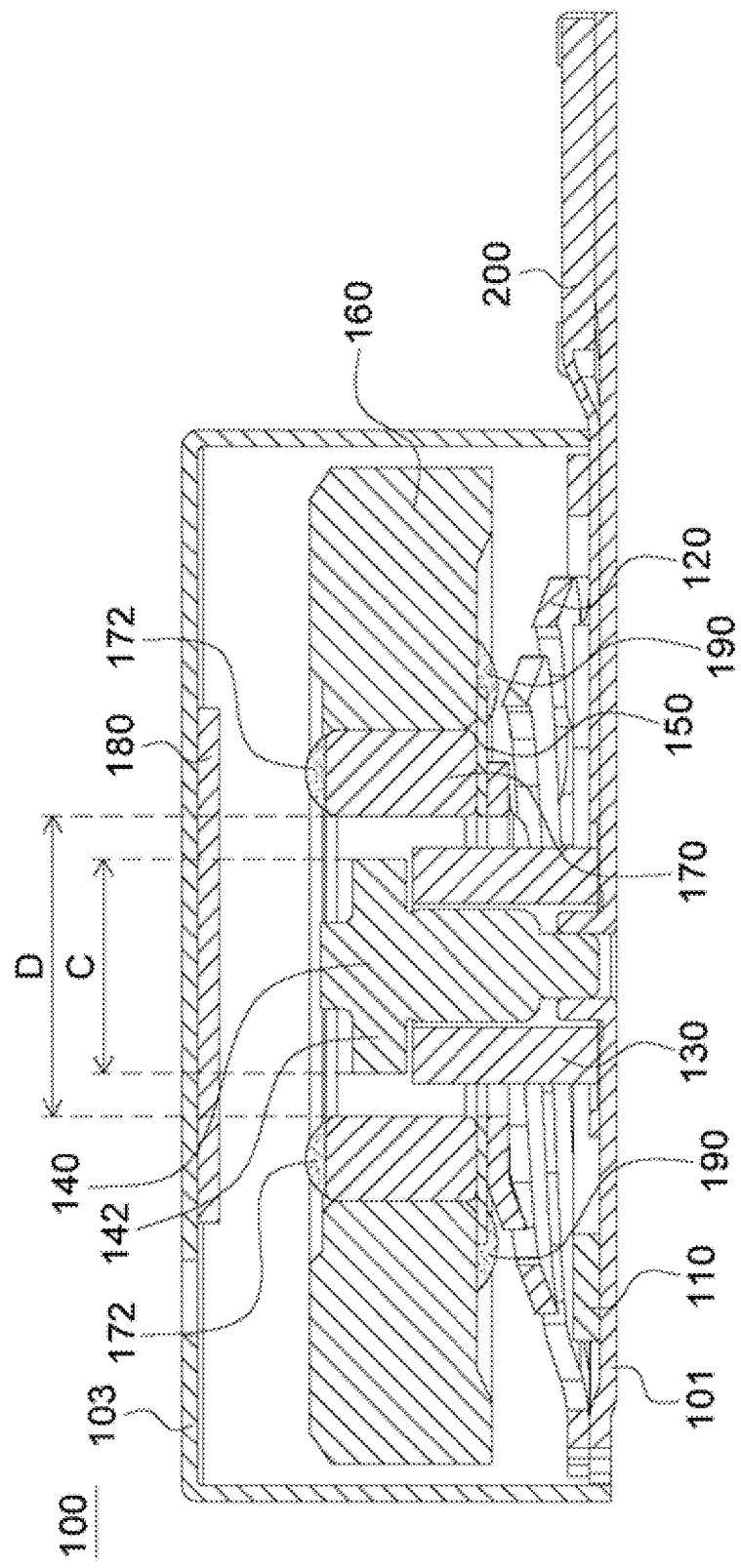
Figure 6C:
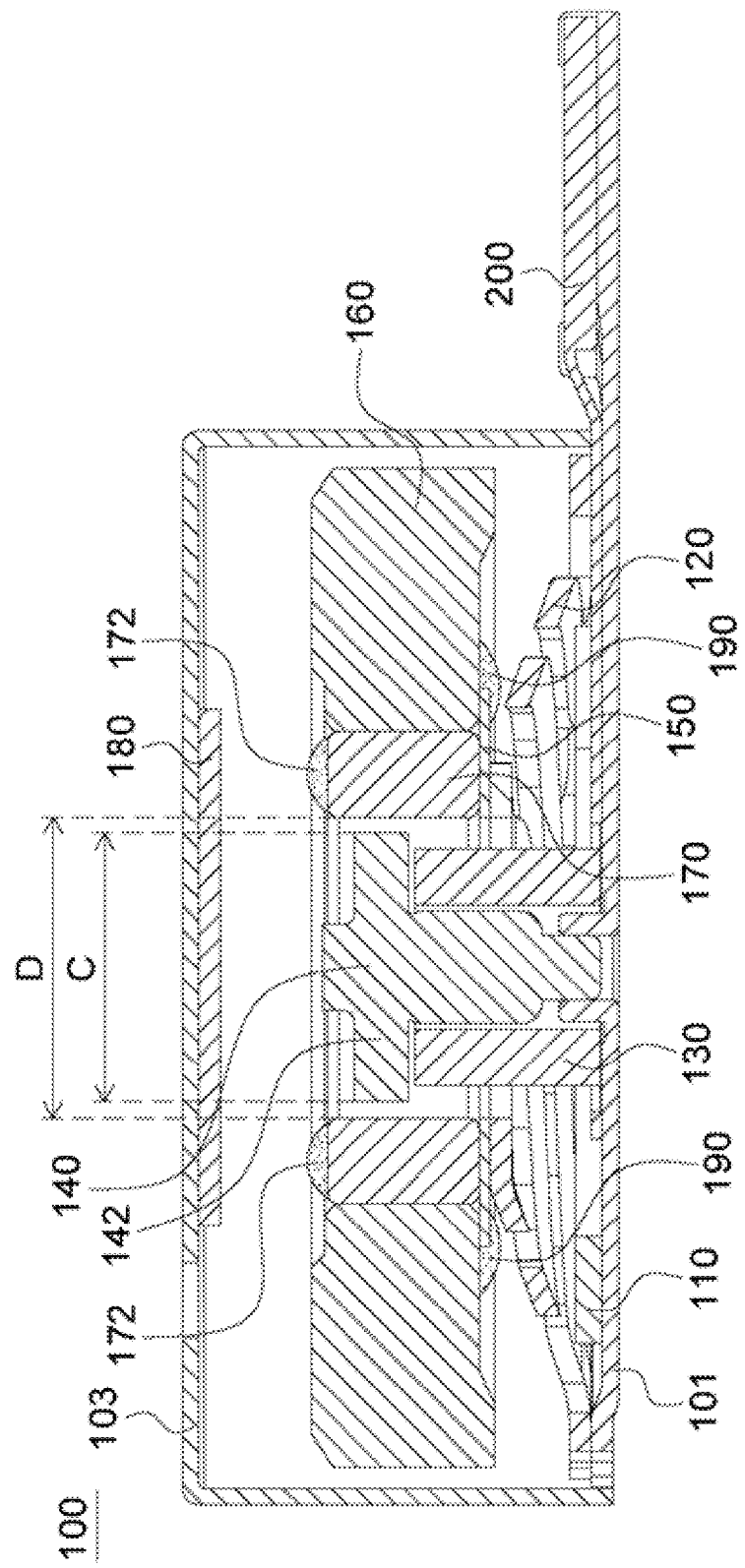

FIGS. 4(*a*), 4(*b*) and 4(*c*) are side-sectional views showing a vibration actuator according to an embodiment of the present disclosure, which is modified according to the change of thickness of a yoke wing portion, FIG. 5 is a graph showing a resonance frequency band according to the change of thickness of the yoke wing portion, depicted in FIGS. 4(*a*), 4(*b*) and 4(*c*), and FIGS. 6(*a*), 6(*b*) and 6(*c*) are side-sectional views showing a vibration actuator according to an embodiment of the present disclosure, which is modified according to the change of diameter of the yoke wing portion.

Referring to FIGS. 4(*a*) to 6(*c*), the yoke 140 of the vibration actuator 100 according to an embodiment of the present disclosure may include a wing portion 142 extending from its center toward it outer circumference.

FIGS. 4(*a*) to 4(*c*) show modifications of the wing portion 142 of the yoke 140 according to a thickness (A). A ratio of the thickness (A) of the wing portion 142 to a thickness (B) of the permanent magnet 170 may serve as a variable for adjusting a resonance frequency band.

Here, the resonance frequency band does not dominate quality but is just selected by means of a band desired by a user and an adjustment method for a vibration power. As a ratio of the thickness (A) of the wing portion 142 to the thickness (B) of the permanent magnet 170, namely an A/B value, is smaller, the vibration power is lowered, and as the A/B value is greater, the vibration power is stronger and the band is broader.

This change may be found in the graph of FIG. 5. Lines A, B, C in the graph respectively represent resonance frequency bands and vibration powers according to modifications depicted in FIGS. 4(*a*), 4(*b*) and 4(*c*).

By using this relation, a thickness ratio of the wing portion 142 of the yoke 140 and the permanent magnet 170 for minimizing a loss of electromagnetic force generated at the same coil 130 and the same permanent magnet 170 may be set.

Here, the A/B value may be determined in the range of 0.05 to 0.7. If the A/B value is smaller than 0.05, the vibration power is too lowered to realize a vibration intensity recognizable by a user, and thus it is substantially not useable.

In addition, if the A/B value is greater than 0.7, the vibration power deviates from the resonance frequency band recognizable by a user, and thus it is also substantially not usable. Therefore, the A/B value may be determined in the range of 0.05 to 0.7.

As described above, since the A/B value may be determined depending on the resonance frequency band and the vibration power, the A/B value may be selected within the above range in consideration of requirements and usages of a portable terminal to which the vibration actuator 100 is actually applied, as desired by a manufacturer.

For example, if the vibration actuator 100 according to the present disclosure is applied to haptic vibrations, a vibration characteristic with a broad resonance frequency band is demanded, and in this case, the A/B value may be determined in the range of 0.25 to 0.5.

Meanwhile, FIGS. 6(*a*) to 6(*c*) show modifications of the wing portion 142 of the yoke 140 according to a diameter (C). A ratio of the diameter (C) of the wing portion 142 to an inner diameter (D) of the permanent magnet 170 may serve as a variable for adjusting a response speed of the vibration actuator 100.

In case of an existing vibration actuator 100, a driver IC should be separately controlled in order to reduce a response speed, particularly a falling time (a stop time after power turns off). However, in case of the vibration actuator 100 according to the present disclosure, by setting a ratio of the diameter (C) of the wing portion 142 to the inner diameter (D) of the permanent magnet 170, namely an optimal C/D value, a rapid response speed may be realized by means of electromagnetic control, instead of a stopper using a mechanical collision or a restoring force of an elastic body.

In detail, the ratio of the diameter (C) of the wing portion 142 to an inner diameter (D) of the permanent magnet 170, namely the C/D value may be determined in the range of 0.4 to 0.99. If the C/D value is smaller than 0.4, the response speed is not better than the existing technique in which a brush-type vibration motor or an eccentric vibration motor such as BLDC is used.

In addition, if the C/D value is greater than 0.99, an interval between the wing portion 142 of the yoke 140 and the permanent magnet 170 is too narrow to allow vibration, and the wing portion 142 of the yoke 140 and the permanent magnet 170 may collide with each other and thus be damaged due to the narrow interval.

Therefore, the C/D value may be in the range of 0.4 to 0.99.

Figure 7:
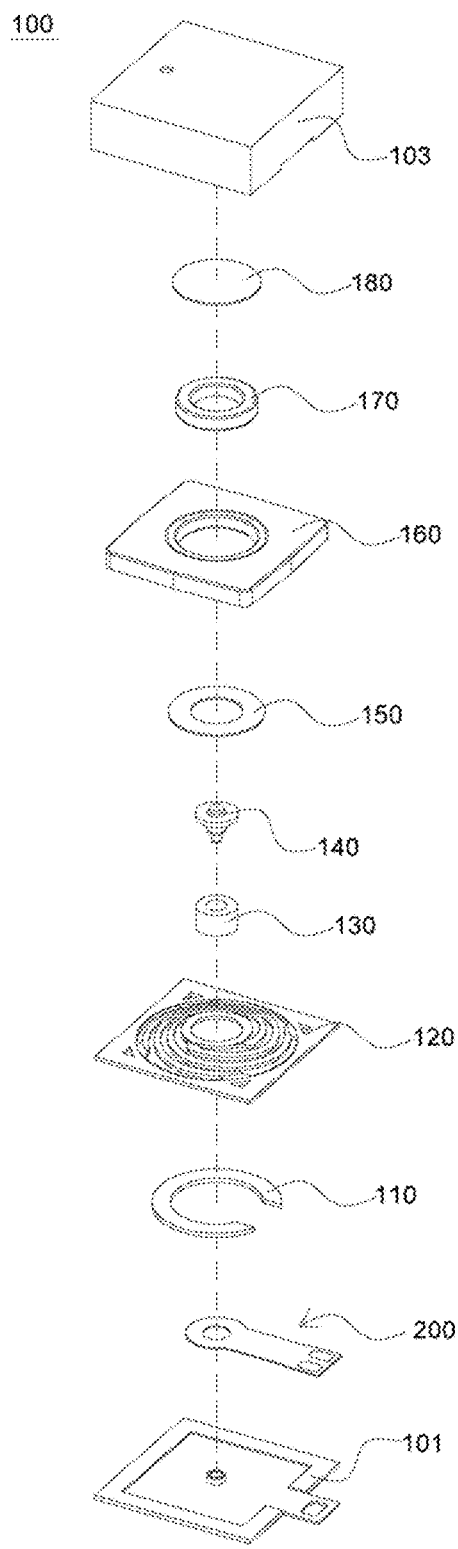
FIGS. 7 and 8 are an exploded perspective view and a side-sectional view showing a vibration actuator according to an embodiment of the present disclosure, which includes a case and a weight with a tetragonal shape.
Figure 8:
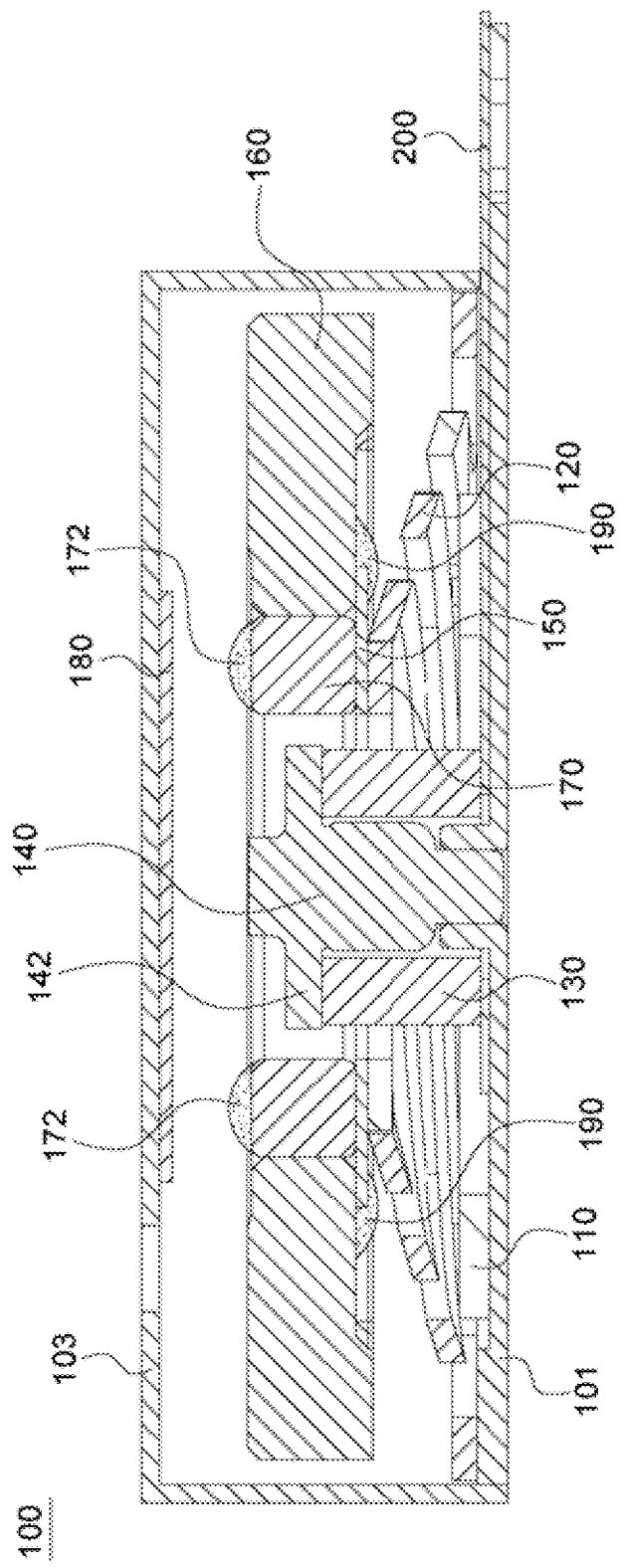
Figure 9:
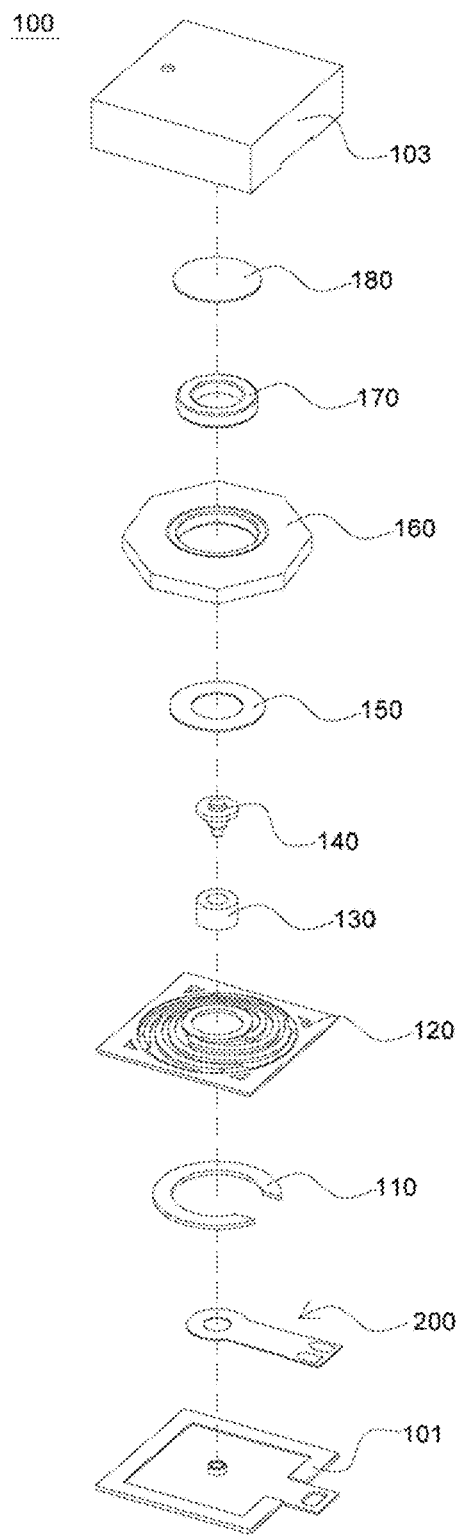
FIGS. 9 and 10 are an exploded perspective view and a side-sectional view showing a vibration actuator according to an embodiment of the present disclosure, which includes a case with a tetragonal shape and a weight with an octagonal shape.
Figure 10:
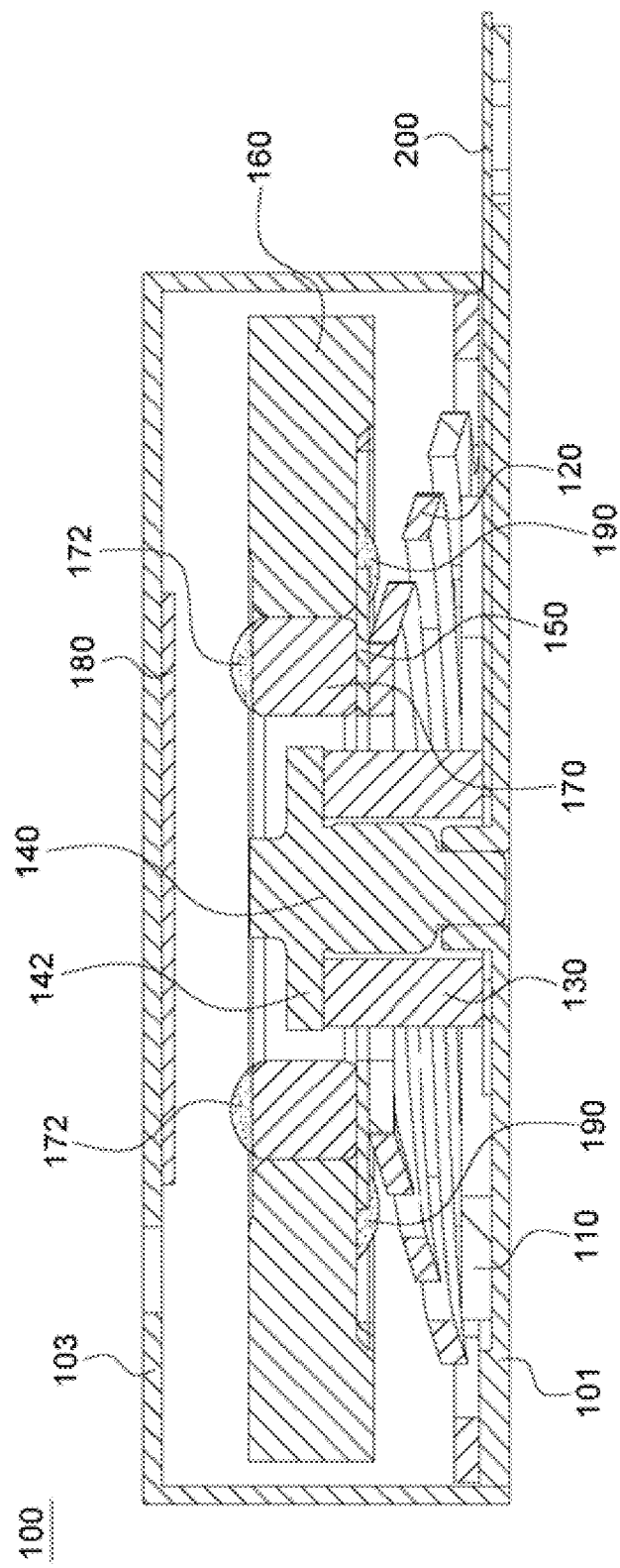

FIGS. 7 and 8 are an exploded perspective view and a side-sectional view showing a vibration actuator according to an embodiment of the present disclosure, which includes a case and a weight with a tetragonal shape, and FIGS. 9 and 10 are an exploded perspective view and a side-sectional view showing a vibration actuator according to an embodiment of the present disclosure, which includes a case with a tetragonal shape and a weight with an octagonal shape.

The technical features of the vibration actuator 100 according to an embodiment of the present disclosure as described above may be applied to various kinds of vibration actuators 100. For example, the modifications of the non-magnetic damper 190 and the wing portion 142 of the yoke 140 as described above may also be identically applied to a vibration actuator 100 having a tetragonal case 103 and a tetragonal weight 160 as shown in FIGS. 7 and 8.

In addition, the same technical features may also be applied to a vibration actuator 100 having a tetragonal case 103 and an octagonal weight 160 as shown in FIGS. 9 and 10.

Hereinafter, the permanent magnet according to an embodiment of the present disclosure will be described in detail with reference to FIGS. 11 and 12.

Figure 11:
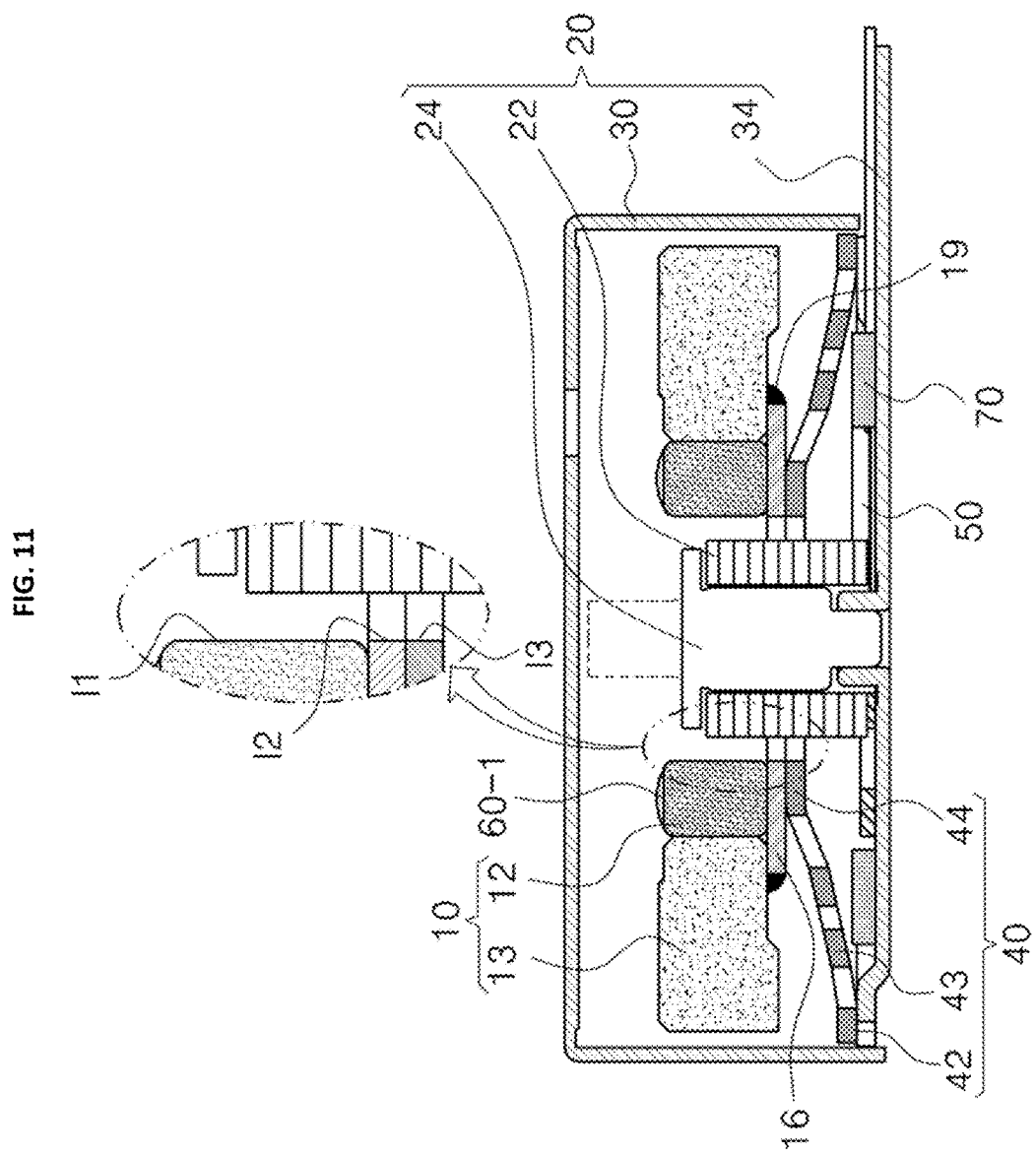
FIG. 11 is a diagram showing a basic configuration of a vibration actuator according to another embodiment.

FIG. 11 is a diagram showing a basic configuration of a vibration actuator. The vibration actuator depicted in FIG. 11 is briefly composed of a vibrator 10 and a stator 20. An elastic member 40 is interposed between the vibrator 10 and the stator 20 to elastically support vertical vibrations of the vibrator 10, and a PCB 50 is disposed on a plate-like bracket 34 of the stator 20 to supply an AC power for generating vibrations.

The vibrator 10 is composed of a permanent magnet 12 for forming a magnetic field and a weight 13 coupled to surround the permanent magnet 12 and giving a weight thereto. In addition, the stator 20 includes a plate-like bracket 34, a cylindrical coil 22 placed on an upper surface of the bracket 34 and disposed at a center of the permanent magnet 12, and a yoke 24 and a case 30 mounted to an inner portion of the coil 22.

The coil 22 is electrically connected to the PCB 50 disposed on the bracket 34 and receives an electric signal forming an electric field from the PCB 50. The vibrator 10 moves up and down with respect to the stator 20 by means of an interaction between the moving magnetic field generated at the coil 22 by the electric signal input from the PCB 50 and the magnetic field generated at the permanent magnet 12, thereby generating vibrations.

Amplitude of the vibrator 10 may be restricted to a suitable range by means of an elastic coefficient of the elastic member 40 and an electromagnetic force between the permanent magnet 12 and the yoke 24. The permanent magnet 12 has an inner diameter not to interfere with the yoke 24 and has a circular shape, namely a donut shape, having opposite polarities in an up and down direction. The yoke 24 is made of a magnetic material and plays a role of focusing the magnetic flux generated at the permanent magnet 12 on the coil 22 wound around the outer circumference thereof.

A plate 16 shaped to cover a part of the vibrator 10 as well as a lower surface of the permanent magnet 12 is provided at the lower surface of the permanent magnet 12. The plate 16 may be provided in a plate shape having a hole formed at a center thereof and plays a role of self-shielding so that the magnetic flux generated at the permanent magnet 12 may be focused toward the coil 22.

The elastic member 40 elastically supports the vibrator 10 which vibrates up and down to give an elastic force for restoring a location of the vibrator 10 with respect to the stator 20, and also plays a role of preventing the vibrator 10 from colliding with the case 30 of the stator 20 by restricting the amplitude of the vibrator 10.

The case 30 of the stator 20 is coupled to the bracket 34 to form an inner space in which the vibrator 10 and the elastic member 40 may be mounted. In addition, the PCB 50 inputs an electric signal provided from the outside to the coil 22, and for this, the PCB 50 is electrically connected to a coil wire drawn from the coil 22.

In addition, in the depicted embodiment, a damping portion 60-1 is provided at an exposed surface of the permanent magnet 12 located at a side opposite to the plate 16 in order to prevent the vibrator 10 from directly contacting the case 30 while fluctuating up and down to generate vibrations. If the damping portion 60-1 is made of a magnetic fluid, even though the damping portion 60-1 is applied directly to an exposed surface of a magnet, it is possible to suppress the phenomenon that the damping portion 60-1 tends to deviate from its original position, by means of the magnetic force of the permanent magnet 12.

In the linear vibration actuator as described above, in order to make the vibrator 10 reciprocate in a linear direction (in a vertical direction on the basis of FIG. 1), the permanent magnet 12 for forming a magnetic field is essential. A vibrating speed of the vibrator 10 in a vertical direction, namely an accelerating force, is determined by means of an electromagnetic force (Lorentz's force) realized by an interaction between the changing electric field generated at the coil 22 and the magnetic field generated at the permanent magnet 12.

Lorentz's force is obtained by multiplying a magnetic flux of the permanent magnet 12 by an intensity of the changing electric field generated at the coil 22, and thus, when the vibrator 10 vibrates vertically, the accelerating force becomes greater by increasing any one of them.

However, if an amount of current supplied to the coil is increased in order to generate strong vibrations recognizable by a human at a short stroke distance of the linear vibration actuator, the battery of the portable terminal is rapidly consumed as described above. Thus, it is practical to use a neodymium magnet having a strong magnetic force as the permanent magnet.

However, the neodymium magnet is oxidized and corroded fast in the art, and thus the surface of the neodymium magnet is coated. At the present, most linear vibration actuators use a neodymium magnet whose surface is plated with nickel. The nickel plating an advantage in an excellent mechanical strength of the plating film, but since it is a ferromagnetic substance, an eddy phenomenon occurs, which causes a loss in the magnetic flux.

The present disclosure is designed to solve this problem, and the surface of the neodymium magnet is plated, particularly electroless-plated, with zinc which is a diamagnetic substance, to prevent any loss of the magnetic flux caused by an eddy phenomenon. Zinc causes less environmental pollution in comparison to nickel, which is also an advantage of the present disclosure.

In addition, the neodymium magnet plated with zinc not only reduces a loss of the magnetic flux but also improves vibration characteristics of the linear vibration actuator, which is an unexpected effect.

FIG. 12 is a graph showing test results when an existing nickel-plated neodymium magnet (a solid line) and a zinc-plated neodymium magnet (a broken line) of the present disclosure are mounted to a linear vibration actuator of the same specification.

An uncoated neodymium magnet is set to have the same magnetic flux of 6.75 Wb (weber), and a current consumption is maintained to be about 150 mA, and a voltage is maintained to be 2.5V.

The graph of FIG. 12 shows measurement results of vibration spectrums of each frequency (Hz) with respect to the nickel-plated neodymium magnet (a solid line) and the zinc-plated neodymium magnet (a broken line). A vibration unit in the Y axis represents an acceleration of gravity (G), and a lower limit of the effective vibration with which a human is able to recognize an operation of the linear vibration actuator mounted to a portable terminal is set to be 1 G.

Seeing a frequency band causing vibrations over an effective vibration value for each specification, it is found that the nickel-plated neodymium magnet (a solid line) has a frequency band of 148 to 188 Hz, and the zinc-plated neodymium magnet (a broken line) has a frequency band of 145 to 201 Hz. In other words, the zinc-plated neodymium magnet of the present disclosure has an effective frequency bandwidth of 56 Hz, which is increased by 30% or above in comparison to the existing nickel-plated neodymium magnet having an effective frequency bandwidth of 40 Hz. However, a maximum vibration value is slightly decreased in the zinc-plated neodymium magnet of the present disclosure.

If the effective frequency bandwidth of the linear vibration actuator is expanded as described above, vibrations transmitted from the portable terminal may be felt better by a user. In other words, since a frequency bandwidth of effective vibrations felt by a user is increased, vibrations may be felt more heavily on the hand of the user, and any feeling tickling the hand is decreased. In addition, when the portable terminal placed on a table gives vibrations, the vibration sound is not light but gives a heavy feeling, thereby reducing noise which irritates the surroundings.

As a result, the linear vibration actuator using the zinc-plated neodymium magnet of the present disclosure ensures improved power consumption by reducing a loss of the magnetic flux and also improves sensitive quality on vibrations of the portable terminal.

If the vibration actuator according to the embodiments of the present disclosure as described above is used, it is possible to solve a problem that a magnetic fluid deviates from its original position to move toward a permanent magnet and thus is not located at a position for performing its damping function.

In addition, it is possible to cope with various vibration characteristics demanded in the art, enlarge an effective frequency range applied in the art, and increase a response speed of the vibration actuator by adjusting design variables in relation to electromagnetic characteristics, rather than a mechanical restoring force.

As described above, the vibration actuator of the present disclosure having a permanent magnet coated with a non-magnetic substance (or, a neodymium magnet) may shift its central frequency area to a lower frequency band as much as about 5 to 10 Hz in comparison to a permanent magnet coated with a magnetic substance, by using the same specification and under the same environments. Also, the vibration actuator (or, a vibration motor) of the present disclosure may also more effectively provide vibration characteristics demanded for haptic operations by enlarging the effective frequency band (see FIG. 12).

In addition, if the embodiment in which a ratio of a thickness of the wing portion to a thickness of the permanent magnet is adjusted and the embodiment in which the permanent magnet is coated with a non-magnetic substance are applied in combination, the frequency band may be expanded further, and thus it is possible to realize the specification for the effective frequency suitable for various needs of users for diverse general purposes.

Further, if the embodiment in which a ratio of an inner diameter of the wing portion to an inner diameter of the permanent magnet is adjusted and the embodiment in which the permanent magnet is coated with a non-magnetic substance are applied in combination, an excellent response speed at a lower frequency band and a vibration characteristic demanded for haptic operations may be optimized simultaneously.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A vibration actuator, comprising:
   a bracket coupled to a case to form an inner space;
   a stator having a circuit board coupled to an upper surface of the bracket, a coil connected to the circuit board, and a wing portion located on an upper portion of the coil;
   a vibrator having a permanent magnet disposed at an outer side of the coil and a weight coupled to an outer circumference of the permanent magnet; and
   an elastic member configured to connect the stator and the vibrator and elastically support the vibrator;
   wherein a ratio of a thickness of the wing portion to a thickness of the permanent magnet is 0.05 to 0.7; and
   the permanent magnet is a neodymium magnet plated with zinc.

2. The vibration actuator according to claim 1, further comprising:
   a plate interposed between the vibrator and the elastic member.

3. The vibration actuator according to claim 1, further comprising:
   a non-magnetic damper provided between the weight and the elastic member,
   wherein the non-magnetic damper is made of liquid grease.

4. The vibration actuator according to claim 1, further comprising:
   a magnetic fluid applied on an upper surface of the permanent magnet.

5. The vibration actuator according to claim 1, wherein a ratio of a diameter of the wing portion to an inner diameter of the permanent magnet is 0.4 to 0.99.

6. The vibration actuator according to claim 1, wherein the neodymium magnet plated with the non-magnetic metal expands an effective vibration frequency bandwidth by at least 30% on the basis of 1G of the vibration actuator in comparison to a nickel-plated neodymium magnet.

7. The vibration actuator according to claim 6, wherein the vibration actuator including the non-magnetic metal-plated neodymium magnet has an effective vibration frequency bandwidth of 52 to 56 Hz.

8. The vibration actuator according to claim 1, further comprising:
   a first damper provided at the upper surface of the bracket and a second damper provided at a lower surface of an upper portion of the case.

9. The vibration actuator according to claim 1, wherein the ratio of a thickness of the wing portion to the thickness of the permanent magnet is 0.25 to 0.5.

10. A vibration actuator, comprising:
    a bracket coupled to a case to form an inner space;
    a stator having a circuit board coupled to an upper surface of the bracket, a coil connected to the circuit board, and a wing portion located on an upper portion of the coil;
    a vibrator having a permanent magnet disposed at an outer side of the coil and a weight coupled to an outer circumference of the permanent magnet; and
    an elastic member configured to connect the stator and the vibrator and elastically support the vibrator, wherein a ratio of a diameter of the wing portion to an inner diameter of the permanent magnet is 0.4 to 0.99; and the permanent magnet is a neodymium magnet plated with zinc.

11. The vibration actuator according to claim 10, further comprising:

a non-magnetic damper provided between the weight and the elastic member.

12. The vibration actuator according to claim 10, wherein the neodymium magnet plated with the non-magnetic metal expands an effective vibration frequency bandwidth by at least 30% on the basis of 1G of the vibration actuator in comparison to a nickel-plated neodymium magnet.

13. The vibration actuator according to claim 12, wherein the vibration actuator including the non-magnetic metal-plated neodymium magnet has an effective vibration frequency bandwidth of 52 to 56 Hz.

* * * * *